United States Patent
Tokura et al.

(10) Patent No.: US 7,824,291 B2
(45) Date of Patent: Nov. 2, 2010

(54) SHIFT CONTROL APPARATUS AND METHOD FOR AUTOMATIC TRANSMISSION

(75) Inventors: Takaaki Tokura, Nagoya (JP); Toshio Sugimura, Nagoya (JP); Tomohiro Asami, Nisshin (JP); Nobufusa Kobayashi, Anjo (JP); Yoshio Hasegawa, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 754 days.

(21) Appl. No.: 11/889,137

(22) Filed: Aug. 9, 2007

(65) Prior Publication Data

US 2008/0070748 A1 Mar. 20, 2008

(30) Foreign Application Priority Data

Sep. 15, 2006 (JP) .............................. 2006-251852

(51) Int. Cl.
*F16H 31/00* (2006.01)
(52) U.S. Cl. ...................................... 475/123
(58) Field of Classification Search ........................ None
See application file for complete search history.

(56) References Cited

U.S. PATENT DOCUMENTS

| | | | | |
|---|---|---|---|---|
| 4,563,917 A | * | 1/1986 | Higashi et al. | 477/133 |
| 5,863,276 A | * | 1/1999 | Lee | 477/144 |
| 6,068,575 A | * | 5/2000 | Tanizawa et al. | 477/144 |
| 6,616,560 B2 | * | 9/2003 | Hayabuchi et al. | 475/116 |
| 7,048,673 B2 | * | 5/2006 | Shim et al. | 477/143 |
| 7,658,693 B2 | * | 2/2010 | Steinhauser et al. | 477/109 |
| 7,717,821 B2 | * | 5/2010 | Steinhauser et al. | 477/79 |
| 2007/0287583 A1 | * | 12/2007 | Steinhauser et al. | 477/71 |

FOREIGN PATENT DOCUMENTS

| | | |
|---|---|---|
| JP | A-62-101960 | 5/1987 |
| JP | A-03-129166 | 6/1991 |
| JP | A-09-026023 | 1/1997 |
| JP | A-09-273626 | 10/1997 |
| JP | A-11-108178 | 4/1999 |
| JP | A-2001-124193 | 5/2001 |
| JP | A-2002-089704 | 3/2002 |
| JP | A-2003-314677 | 11/2003 |
| JP | A-2006-064018 | 3/2006 |

* cited by examiner

*Primary Examiner*—Dirk Wright
(74) *Attorney, Agent, or Firm*—Oliff & Berridge, PLC

(57) ABSTRACT

When a determination for a second shift is made during a first shift process, if the turbine speed is the variety of the synchronous rotational speed for the speed to which the automatic transmission is to be shifted in the second shift and the hydraulic pressure command value for the first brake, which is engaged in the second shift, is equal to or larger than a predetermined value, the multiple shift portion immediately switches the shift control from the first shift control to the second shift control so that the hydraulic pressure command value for the first brake, which is engaged in the second shift, increase at a specific rate and the hydraulic pressure command value for the third brake, which is released in the second shift, decreases at a specific rate.

14 Claims, 9 Drawing Sheets

FIG.2

|  | C1 | C2 | B1 | B2 | B3 |
|---|---|---|---|---|---|
| 1st | ○ |  |  | ○ |  |
| 2nd | ○ |  | ○ |  |  |
| 3rd | ○ |  |  |  | ○ |
| 4th | ○ | ○ |  |  |  |
| 5th |  | ○ |  |  | ○ |
| 6th |  | ○ | ○ |  |  |
| Rev |  |  |  | ○ | ○ |

SHIFT CONTROL APPARATUS AND METHOD FOR AUTOMATIC TRANSMISSION

INCORPORATION BY REFERENCE

The disclosure of Japanese Patent Application No. 2006-251852 filed on 15 Sep. 2006 including the specification, drawings and abstract is incorporated herein by reference in its entirety.

BACKGROUND OF THE INVENTION

1. Field of the Invention

The invention relates to a shift control apparatus and a shift control method for an automatic transmission, and particularly to a shift control that is performed when a multiple shift determination is made due to a determination for a second shift being made during a first shift.

2. Description of the Related Art

Automatic transmissions that shift among a plurality of speeds with different speed ratios by selectively engaging multiple friction coupling elements are widely used in vehicles, and so on. An automatic transmission switches from a first shift control to a second shift control when a multiple shift determination is made due to a determination for a second shift process being made during a first shift process, even if the first shift control is being executed. In this case, the automatic transmission performs a "return multiple shift" that is a shift for bringing the automatic transmission back to the speed that the automatic transmission was in before the first shift process was activated. Here, it is assumed that the second shift process determination that is described above is made before the inertia phase of the first shift process that the rotational speed of the input shaft of the automatic transmission changes, that is, when the rotational speed of the input shaft of the automatic transmission is still in the vicinity of the synchronous rotational speed for the speed to which the automatic transmission is to be shifted in the second shift process. In such a case, because the progress of the ongoing first shift process can not be accurately determined, if the second shift process is activated, it may cause the friction coupling elements to be engaged or released at incorrect timings and thus shift shocks may occur. That is, when the inertia phase of the first shift process has not yet started, it does not always mean that the friction coupling device that is released in the first shift process and engaged in the second shift process is still fully engaged. That is, that friction coupling element, before the beginning of the inertia phase of the first shift process, may be already in a fully released where no hydraulic fluid is left in the hydraulic cylinder or in a released state where a certain amount of hydraulic fluid is left in the hydraulic cylinder. Thus, in such a state, it is difficult to perform appropriate shift control of the automatic transmission. In the technology described in JP-A-2001-124193, the switching from the first shift process to the second shift process is carried out when it is determined that the first shift process has progressed sufficiently and thus the second shift process may be appropriately performed.

However, if the start of the second shift process is thus delayed, it diminishes the responses to the acceleration requests, etc, from the driver, and therefore discomfort during driving occurs.

SUMMARY OF THE INVENTION

The invention provides a shift control apparatus for an automatic transmission that, when a multiple shift determination is made due to a determination for a second shift process being made during a first shift process, switches the shift control of the automatic transmission from a first shift control for the first shift process to a second shift control for the second shift process. The shift control apparatus includes: (a) an engagement force determination portion that determines whether the engagement force of an friction coupling element to be engaged at an engagement side in the second shift process is equal to or larger than a predetermined value, when the multiple shift determination has been made, based on a command value associated with the engagement force of the friction coupling element to be engaged at the engagement side; and (b) a shift switching portion that, if the engagement force determination portion determines that the engagement force of the friction coupling element to be engaged at the engagement side is equal to or larger than the predetermined value, immediately switches the shift control of the automatic transmission from the first shift control to the second shift control.

According to the shift control apparatus described above, if the rotational speed of the input shaft of the automatic transmission is in the vicinity of the synchronous rotational speed for the speed to which the automatic transmission is to be shifted in the second shift process, when a multiple shift determination is made, that is, if a determination for the second shift process, which shifts the automatic transmission back to the speed that the automatic transmission was in before the first shift control was activated (return multiple shift), has been made before the beginning of the inertia phase of the first shift process in which the rotational speed of the input shaft of the automatic transmission changes, the shift switching portion immediately switches the shift control from the first shift control to the second shift control using the shift switching portion, provided that the hydraulic pressure command value associated with the engagement force of the friction coupling element to be engaged at the engagement side is equal to or larger than the predetermined value. Thus, the second shift control may be quickly activated while suppressing shift shocks and therefore the response to acceleration requests from the driver improves accordingly. Namely, when the engagement force of the friction coupling element to, be engaged at the engagement side is equal to or larger than the predetermined value, it indicates that the first shift process has not yet proceeded sufficiently and the friction coupling element to be engaged at the engagement side is still engaged with at least a certain amount of hydraulic fluid being left in the hydraulic cylinder of the first brake B1 (a backlash-free state). In this case, therefore, even if the shift control is immediately switched to the second shift control, the second shift control may be appropriately executed while suppressing shift shocks.

A second aspect of the invention relates to a shift control method that, when a multiple shift determination is made due to a determination for a second shift process being made during a first shift process, switches the shift control of the automatic transmission from a first shift control for the first shift process to a second shift control for the second shift process. This shift control method includes: (a) determining whether the engagement force of an friction coupling element to be engaged at an engagement side in the second shift process is equal to or larger than a predetermined value, when the multiple shift determination has been made, based on a command value associated with the engagement force of the friction coupling element to be engaged at the engagement side; and, if it is determined that the engagement force of the friction coupling element to be engaged at the engagement side is equal to or larger than the predetermined value, (b)

immediately switching the shift control of the automatic transmission from the first shift control to the second shift control.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is an engagement chart illustrating the engaged and released states of the clutches and brakes at each speed of the automatic transmission;

DETAILED DESCRIPTION OF THE EXEMPLARY EMBODIMENTS

Figure 1:
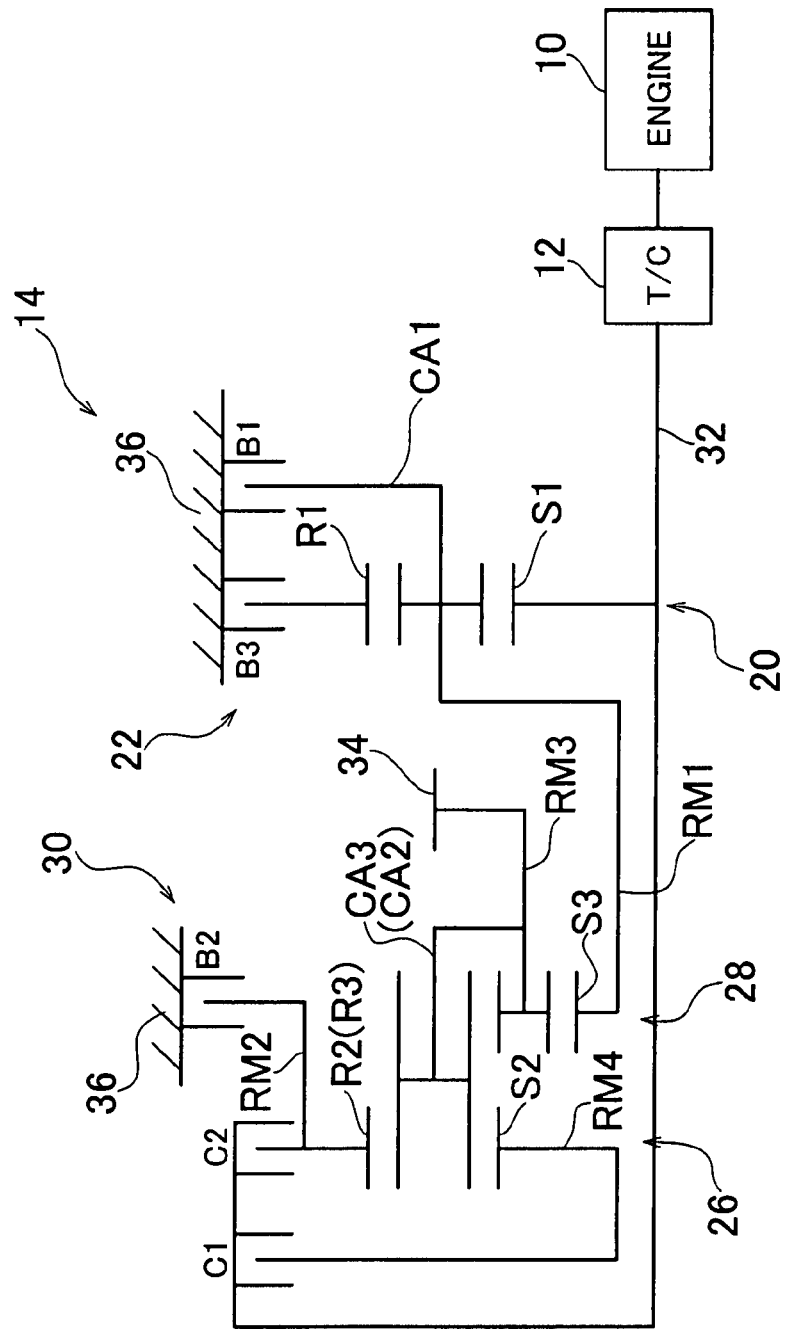
FIG. 1 is a view schematically showing the configuration of a drive system of a vehicle.

Hereinafter, an example embodiment of the invention will be described in detail with reference to the accompanying drawings. FIG. 1 is a view schematically showing the configuration of a drive system for a vehicle employing a transverse engine layout, such as a FF (Front-engine Front-drive) vehicle. Referring to FIG. 1, the output of an internal combustion engine 10, which is for example a gasoline engine, is transmitted to the drive wheels (front wheels) of the vehicle via a torque converter 12, an automatic transmission 14, and a differential gear unit, which is not shown in the drawings. The engine 10 serves as the drive power source for driving the vehicle. The torque converter 12 is a fluid coupling.

The automatic transmission 14 has, as its main structural sections, a first shift block 22 that is principally comprised of a first planetary gearset 20 of a single pinion type and a second shift block 30 that is principally comprised of a second planetary gearset 26 of a single pinion type and a third planetary gearset 28 of a double pinion type. The first planetary gearset 20, the second planetary gearset 26, and the third planetary gearset 28 are arranged on a common axis. Thus configured, the automatic transmission 14 changes the rotation of an input shaft 32 as needed and then outputs the rotation from an output gear 34. The input shaft 32 serves as an input member and is a turbine shaft of the torque converter 12 in the example embodiment. The output gear 34 serves as an output member which turns the left and right drive wheels via the differential gear unit. Note that the automatic transmission 14 is substantially symmetrical about the axis and the lower half of the automatic transmission 14, which is below the axis, is not shown in FIG. 1.

The first planetary gearset 20 in the first shift block 22 has three rotational elements: a sun gear S1, a carrier CA1, and a ring gear R1. As the sun gear S1, which is coupled with the input shaft 32, is turned by the input shaft 32 while the ring gear R1 is held stationary by a case 36 via a third brake B3, the carrier CA1, as an intermediate output member, rotates at a speed lower than the rotational speed of the input shaft 32 and the reduced rotation is then output from the carrier CA1. In the second planetary gearset 26 and the third planetary gearset 28 in the second shift block 30, on the other hand, some portions of the planetary gearsets 26, 28 are linked to or coupled with each other and thereby provide four rotational elements RM1 to RM4. Specifically, the first rotational element RM1 is constituted by a sun gear S3 of the third planetary gearset 28. The second rotational element RM2 is constituted by a ring gear R2 of the second planetary gearset 26 and a ring gear R3 of the third planetary gearset 28 that are coupled with each other. The third rotational element RM3 is constituted by a carrier CA2 of the second planetary gearset 26 and a carrier CA3 of the third planetary gearset 28 that are coupled with each other. The fourth rotational element RM4 is constituted by a sun gear S2 of the second planetary gearset 26. That is, the second planetary gearset 26 and the third planetary gearset 28 together provide a ravigneaux planetary geartrain in which the carrier CA2 and the carrier CA3 are formed by a common member, the ring gear R2 and the ring gear R3 are formed by a common member, and the pinion gears of the second planetary gearset 26 serve also as the second pinion gears of the third planetary gearset 28.

The first rotational element RM1 (the sun gear S3) is selectively held stationary by the case 36 via the first brake B1. The second rotational element RM2 (the ring gears R2, R3) is selectively held stationary by the case 36 via a second brake B2. The fourth rotational element RM4 (the sun gear S2) is selectively connected to the input shaft 32 via a first clutch C1. The second rotational element RM2 (the ring gears R2, R3) is selectively connected to the input shaft 32 via a second clutch C2. The first rotational element RM1 (the sun gear S3) is integrally coupled with the carrier CA1 of the first planetary gearset 20 as the intermediate output member. The third rotational element RM3 (the carrier CA2, CA3) is integrally coupled with the output gear 34. Through such connections among the rotational elements RM1 to RM4, the automatic transmission 14 outputs rotation via the output gear 34.

Figure 2:
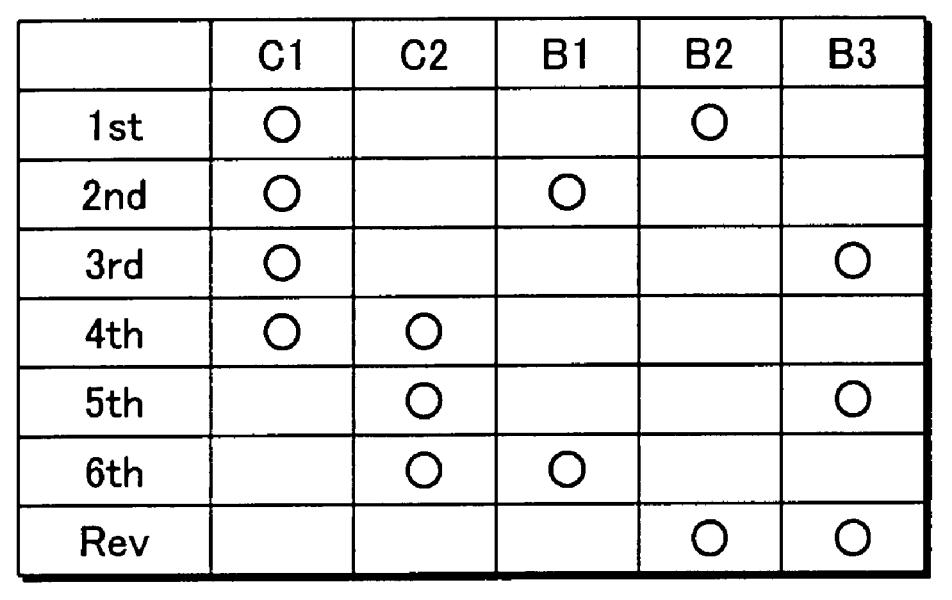

The clutches C1, C2 and the brakes B1, B2, B3 (will be simply referred to as "clutches C" and "brakes B" where distinction of a specific one or more of them is unnecessary) are hydraulically-driven friction coupling devices, such as multi-plate clutches and band brakes, which are engaged by hydraulic actuators. The clutches C and the brakes B are engaged and released as indicated in FIG. 2 by linear solenoid valves SL1 to SL5 of a hydraulic control circuit 98 (See FIG. 3) being selectively excited and a manual valve, which is not shown in the drawings, being operated, so that one of the six forward drive speeds and a revise speed is established in accordance with the position (operation position) of a shift lever 72 (See FIG. 3). In FIG. 2, "1st" to "6th" represent the first to six forward drive speeds, respectively, and "Rev" represents a reverse drive speed. The speed ratio (input shaft rotational speed NIN/output shaft rotational speed NOUT) at each speed of the automatic transmission 14 is determined according to the gear ratio ρ1 of the first planetary gearset 20, the gear ratio ρ2 of the second planetary gearset 26, and the gear ratio ρ3 of the third planetary gearset 28. In FIG. 2, the circles represent "engaged" and the blanks represent "released".

The shift lever 72 is selectively operated to the parking position "P", the reverse drive position "R", the neutral position "N", and the forward drive positions "D", "4", "3", "2", "L". At the "P" and "N" positions, the automatic transmission 14 is placed in a neutral state where the flow of drive power is interrupted. Also, at the "P" position, the drive wheels are mechanically locked by a mechanical parking mechanism, which is not shown in the drawings, so as not to rotate.

Figure 3:
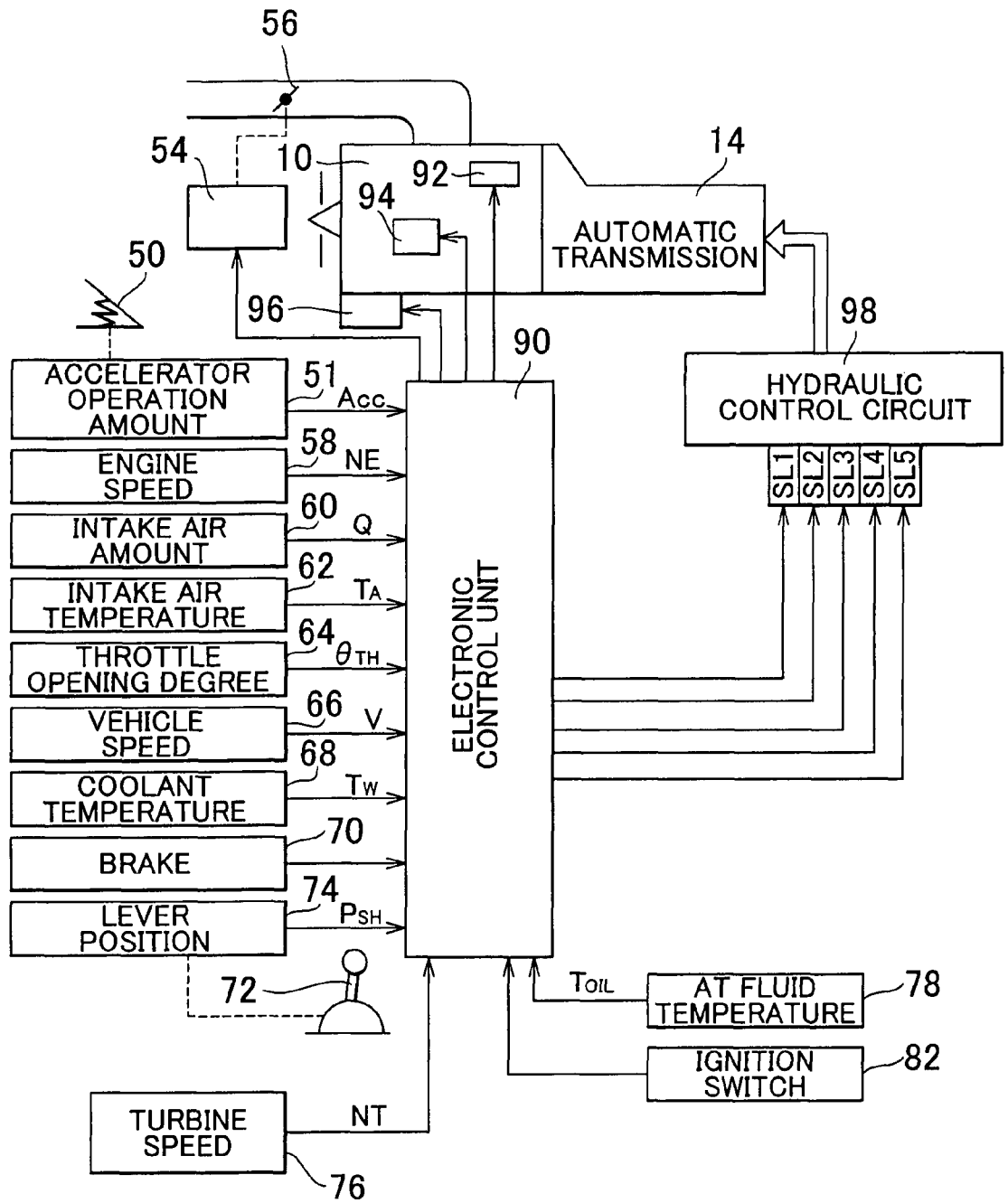
FIG. 3 is a view illustrating the signals input to and output from an electronic control unit provided in the vehicle in the embodiment shown in FIG. 1.
Figure 4:
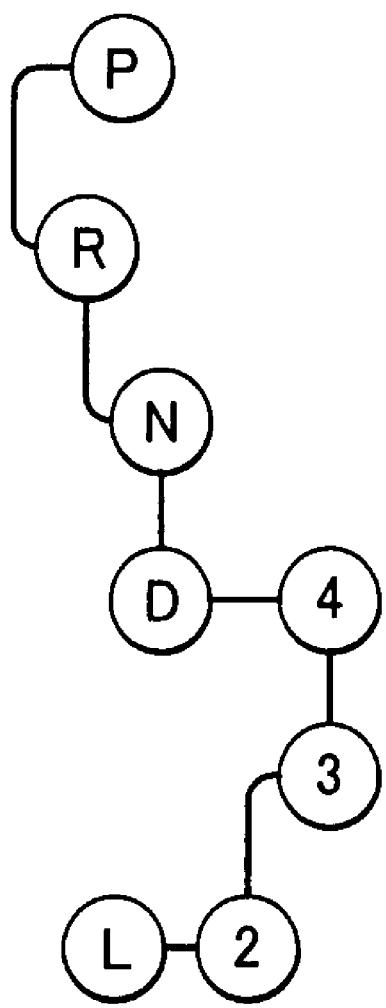
FIG. 4 is a view showing one example of the shift pattern of the shift lever.

FIG. 3 is a block diagram illustrating the control system that is incorporated in the vehicle to control the engine 10, the automatic transmission 14, and so on, shown in FIG. 1. Referring to FIG. 1, an accelerator operation amount sensor 51 detects the operation amount (pedal travel) Acc of an accelerator pedal 50. The accelerator pedal 50 is sharply depressed by a driver according to the amount of output that the driver requires. Thus, the accelerator pedal 50 serves as an accelerator operation member, and the accelerator operation amount Acc corresponds to a required output amount. An electronic throttle valve 56 is provided in the intake passage of the engine 10. A throttle actuator 54 changes the throttle opening degree $\theta_{TH}$ of the electronic throttle valve 56 is changed. As well as these, there are provided: an engine speed sensor 58 that detects an engine speed NE of the engine 10, an intake air amount sensor 60 that detects an intake air amount Q to the engine 10; an intake air temperature sensor 62 that detects a temperature $T_A$ of intake air, a throttle sensor 64 having an idle switch, which detects the fully-closed state of the electronic throttle valve 56 (idling state of the engine 10) and detects the throttle opening degree $\theta_{TH}$ of the electronic throttle valve 56; a vehicle speed sensor 66 that detects a rotational speed NOUT of the output gear 34 (i.e., the output shaft rotational speed) that corresponds to the vehicle speed V; a coolant temperature sensor 68 that detects a coolant temperature $T_W$ of coolant for the engine 10, a brake switch 70 that detects whether the foot brake of the vehicle is being operated; a lever position sensor 74 that detects a lever position (operation position) $P_{SH}$ of the shift lever 72; a turbine speed sensor 76 that detects a turbine speed NT; an AT fluid temperature sensor 78 that detects an AT fluid temperature $T_{OIL}$ which is the temperature of hydraulic fluid in the hydraulic control circuit 98; and an ignition switch 82. From these sensors and switches, an electronic control unit 90 receives signals indicating the engine speed NE, the intake amount Q, the intake air temperature $T_A$, the throttle opening degree $\theta_{TH}$, the vehicle speed V (the output shaft rotational speed NOUT), the engine coolant temperature $T_W$, the operation of the foot brake, the shift lever position $P_{SH}$ of the shift lever 72, the turbine speed NT, the AT fluid temperature $T_{OIL}$, the operation position of the ignition switch 82, and so on. Note that the turbine speed NT is equal to the rotational speed (input shaft rotational speed NIN) of the input shaft 32 as the input member.

Figure 5:
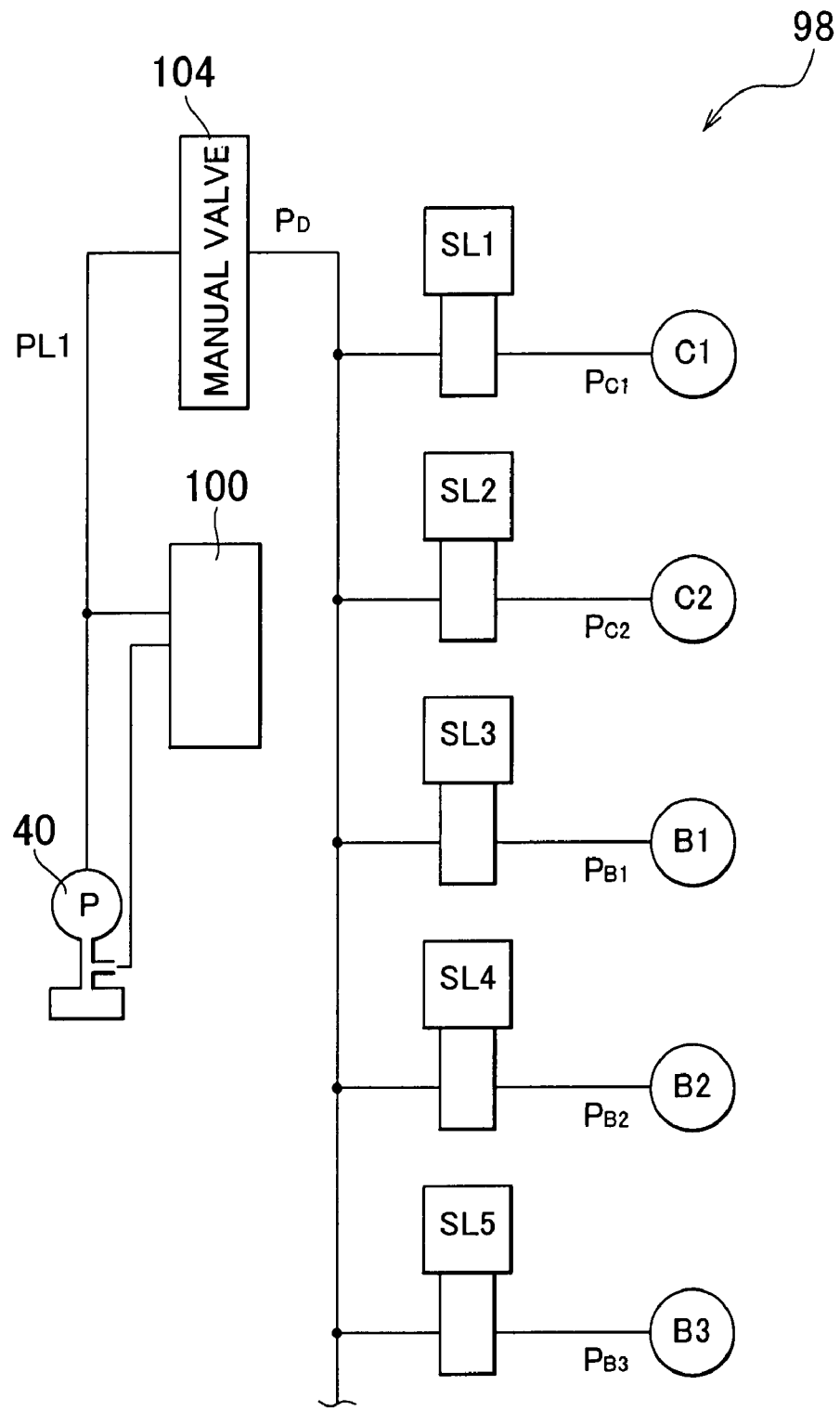
FIG. 5 is a circuit diagram showing a section of the hydraulic control circuit shown in FIG. 3 which is related to the shift control of the automatic transmission.

The hydraulic control circuit 98 includes the circuit shown in FIG. 5, which is used for the shift control of the automatic transmission 14. Referring to FIG. 5, after the hydraulic fluid is discharged at a certain pressure from an oil pump 40, the pressure is adjusted to a first line pressure PL1 by a relief type pressure regulator valve 100. The oil pump 40 may be, for example, a mechanical pump that is rotationally driven by the engine 10. The pressure regulator valve 100 adjusts the pressure of the hydraulic fluid to the first line pressure PL1 in accordance with a turbine torque TT, that is, an input torque TIN of the automatic transmission 14 or the throttle opening degree $\theta_{TH}$ as an alternative value of the input torque TIN. The first line pressure PL1 thus obtained is supplied to the manual valve 104 that operates as the shift lever 72 is operated. When the shift lever 72 is at the "D" position or other forward drive position, a forward drive position pressure PD, which is equal to the first line pressure PL1, is supplied to the linear solenoid valves SL1 to SL5. The linear solenoid valves SL1 to SL5 are provided for the clutches C1, C2 and the brakes B1, B2, B3, respectively. The excitation states of the linear solenoid valves SL1 to SL5 are controlled in accordance with the drive signals output from the electronic control unit 90, whereby each of the engagement pressures PC1, PC2, PB1, PB2, PB3 of the clutches C1, C2 and the brakes B1, B2, B3 is independently controlled to select one of the first speed "1st" to the sixth speed "6th ". Each of the linear solenoid valves SL1 to SL5 is of a large capacity type. Therefore, the output hydraulic pressures of the linear solenoid valves SL1 to SL5 are directly supplied to the clutches C1, C2 and the brakes B1, B2, B3, and thus the engagement pressures PC1, PC2, PB1, PB2, PB3 are directly controlled.

The electronic control unit 90 is provided with a so-called microcomputer including a CPU (Central Processing Unit), a RAM (Random Access Memory), a ROM (Read-Only Memory), input and output interfaces, etc. The CPU performs signal processing on programs stored in the ROM while utilizing the temporary recording function of the RAM and thus provide the respective functions in an engine control portion 120 and a shift control portion 130 shown in FIG. 6. Note that the CPU may incorporate separate structural sections for the engine control and the shift control if necessary.

Figure 7:
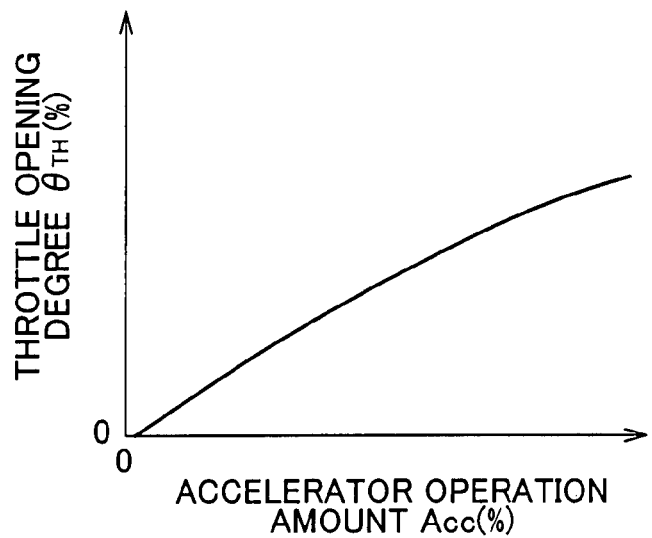
FIG. 7 is a graph illustrating one example of a relationship between the accelerator operation amount Acc and the throttle opening degree $\theta_{TH}$, which are used in the throttle control that is executed by the engine control portion shown in FIG. 6.

The engine control portion 120 executes the output control of the engine 10. Specifically, the engine control portion 120 controls the throttle actuator 54 to open and close the electronic throttle valve 56, controls fuel injection valves 92 (See FIG. 3) to control the injection amount of fuel, and controls ignition devices 94, which are for example igniter, to control the ignition timings. In the control of the electronic throttle valve 56, the throttle actuator 54 is driven based on the actual accelerator operation amount Acc and in accordance with the relationship shown in FIG. 7 such that the throttle opening degree $\theta_{TH}$ increases as the accelerator operation amount Acc increases. Upon start-up of the engine 10, a starter (electric motor) 96 cranks the engine 10.

Figure 6:
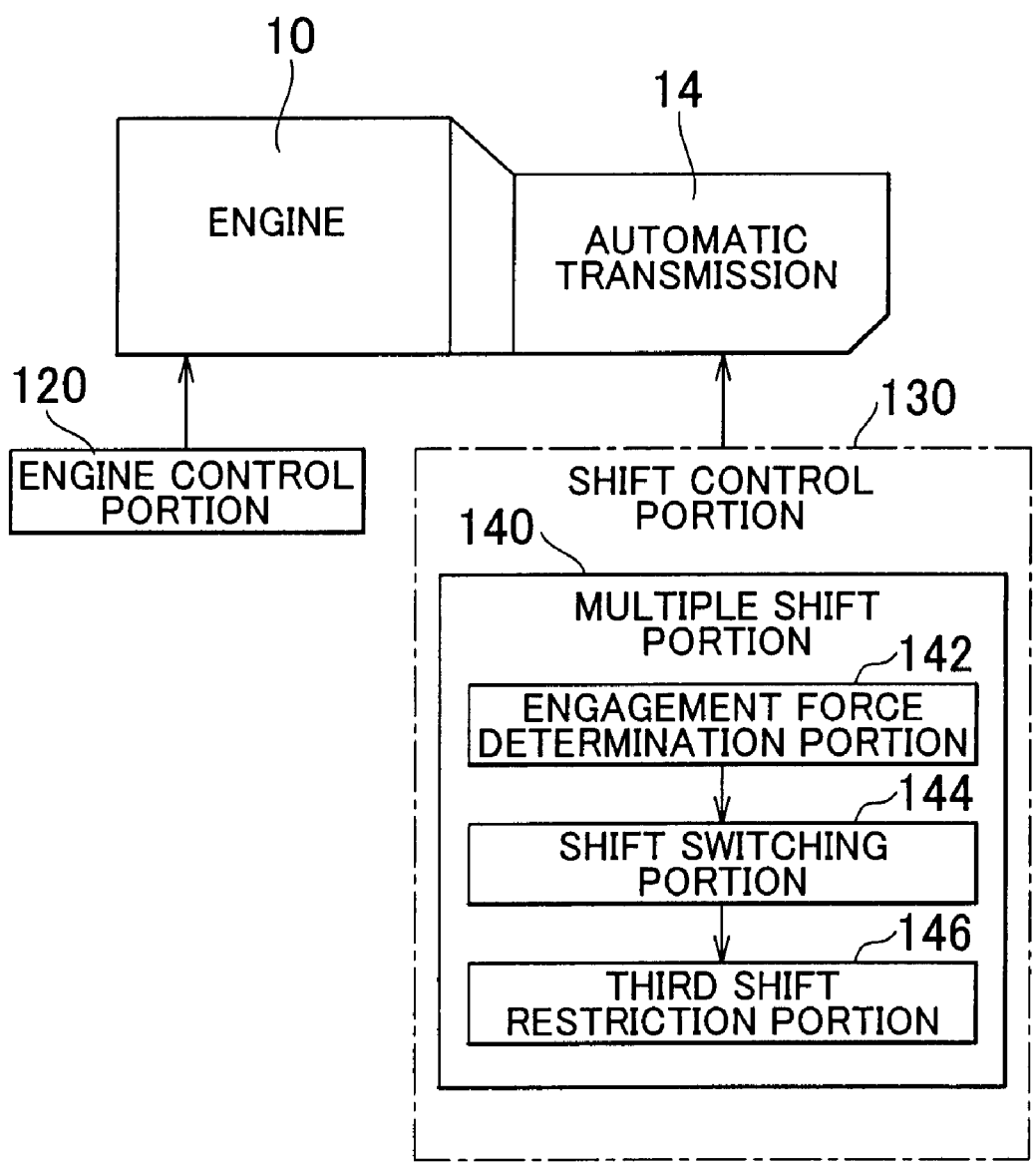
FIG. 6 is a block diagram illustrating the functions of the electronic control unit shown in FIG. 3.
Figure 8:
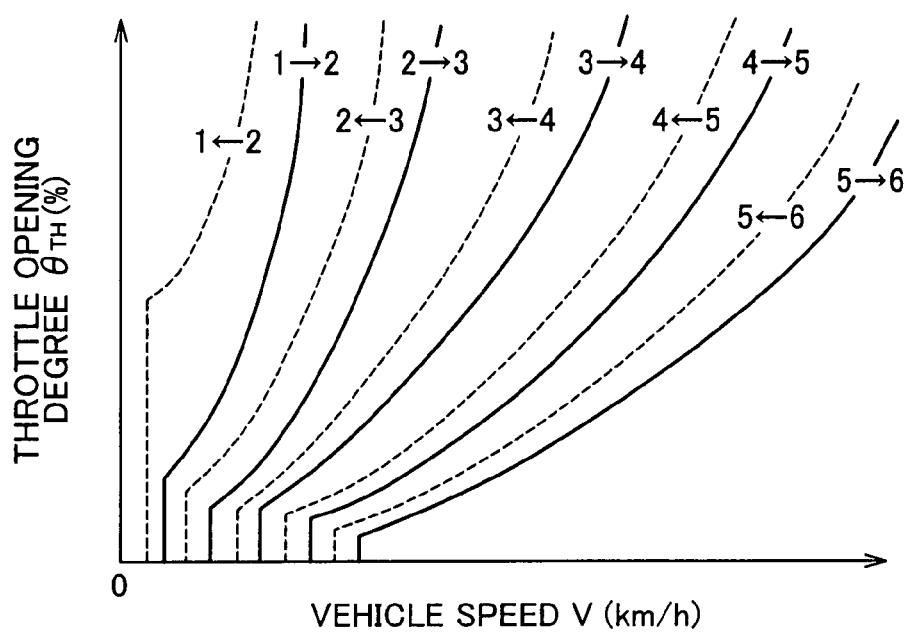
FIG. 8 is a shift curve chart (shift map) that is used in the shift control of the automatic transmission that is executed by the shift control portion shown in FIG. 6.

Meanwhile, the shift control portion 130 executes the shift control of the automatic transmission 14. By applying the throttle opening degree $\theta_{TH}$ and the vehicle speed V to, for example, a presorted shift curve chart (shift map) shown in FIG. 8, the shift control portion 130 determines the speed to which the automatic transmission 14 should be shifted, in other words, determines to shift the automatic transmission 14 from the present speed to that speed. Then, the shift control portion 130 activates a shift operation for shifting the automatic transmission 14 to the determined speed, changing the excitation states of the linear solenoid valves SL1 to SL5 as needed. At this time, the excitation states of the linear solenoid valves SL1 to SL5 are continuously changed to avoid shift shocks, such as those caused by changes in the drive power, and to prevent reduction of the endurances of the friction portions in the clutches C and the brakes B. As is evident from FIG. 2, the automatic transmission 14 execute a "clutch-to-clutch shift" in which one of the clutches C and the brakes B is released and another of the clutches C and the brakes B is engaged, so that the automatic transmission 14 shifts the speed to the neighboring speed. The solid curves in FIG. 8 are upshift curves and the dotted curves are downshift curves. Based on these upshift and downshift curves, the automatic transmission 14 shifts to a lower speed having a higher speed ratio as the vehicle speed V decreases or as the throttle opening degree $\theta_{TH}$ increases. In FIG. 6, the numerals "1" to "6" represent the first speed "1st" to the sixth speed "6th", respectively.

Operating the shift lever 72 to the "D" position establishes the D range (automatic shift mode), which is the highest drive range in which the automatic transmission 14 shifts among all the forward drive speeds "1st" to "6th". Likewise, operating the shift lever 72 to the "4" position, to the "3" position, to the "2" position, and to the "L" position establish the 4 range, the 3 range, the 2 range, and the L range, respectively. In the 4 range, the shift control of the automatic transmission 14 is performed using the speeds up to the fourth speed "4th". In the 3 range, the shift control of the automatic transmission 14 is performed using the speeds up to the third speed "3rd". In the 2 range, the shift control of the automatic transmission 14 is performed using the speeds up to the second speed "2nd". In the L range, the automatic transmission 14 is held at the first speed "1st". Thus, as the shift lever 72 is operated from the "D" position to the "4" position, to the "3" position, and to the "2" position, the shift range changes from the D range to the 4 range, to the 3 range, and to the 2 range. As the shift range thus changes, the automatic transmission 14 is forced to shift from the sixth speed "6th" down to the fourth speed "4th", to the third speed "3rd", and to the second speed "2nd". As such, the driver may manually change the speed of the automatic transmission 14 by operating the shift lever 72.

Figure 9:
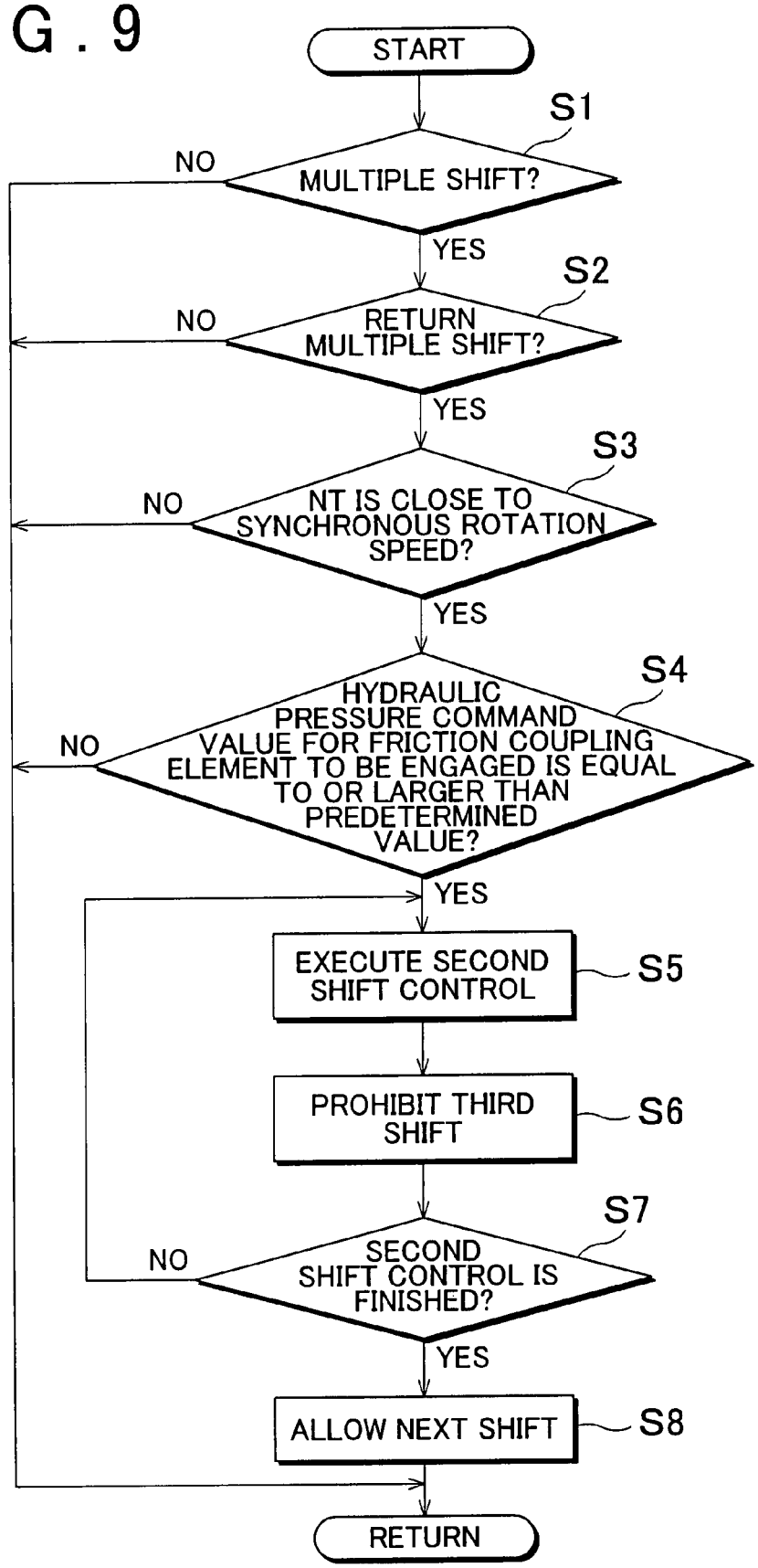
FIG. 9 is a flowchart indicating details of the processes executed by the engagement force determination portion, the shift switching portion, and the third shift control restriction portion, which are provided in the shift switching portion shown in FIG. 6.

The shift control portion 130 includes a multiple shift portion 140. Here, it is assumed that a multiple shift determination has just been made due to a determination for performing another shift process (second shift process) being made while a preceding shift process (first shift process) is ongoing, and the second shift process is the one for a "return multiple shift" that shifts the automatic transmission 14 back to the speed that the automatic transmission 14 was in before the first shift process was activated. In this state, if given conditions are satisfied, the multiple shift portion 140 immediately switches the shift control from the first shift control for the first shift process to the second shift control for the second shift process, even before the beginning of an inertia phase of the first shift process where the turbine speed NT, which is the input shaft rotational speed, changes, that is, even when the turbine speed NT is still in the vicinity of the synchronization speed for the speed to which the automatic transmission 14 is to be shifted in the second shift process. In order to perform such control, the multiple shift portion 140 is provided with an engagement force determination portion 142, a shift switching portion 144, and a third shift restriction portion 146, and performs signal processing as illustrated in the flowchart of FIG. 9. Note that step 4 in the flowchart of FIG. 9 corresponds to the engagement force determination portion 142, step 5 to the shift switching portion 144, and step 6 to the third shift restriction portion 146.

Figure 10:
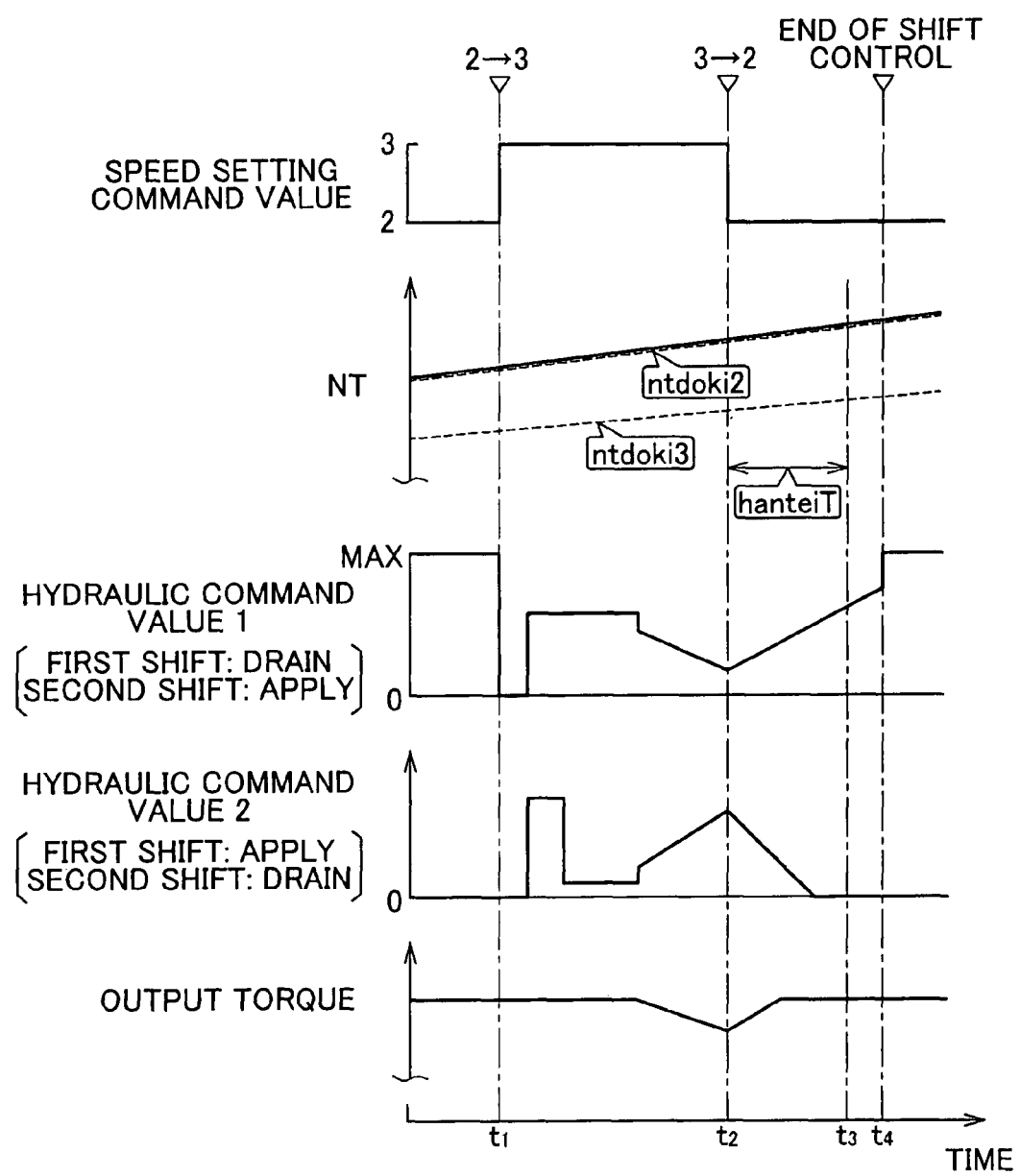
FIG. 10 is one example of a time chart that illustrates changes that occur as signal processing is performed for a 2nd-3rd-2nd return multiple shift according to the flowchart of FIG. 9 where "YES" is obtained in step 4.

FIG. 10 is an example of a time chart that illustrates the changes that occur as the multiple shift portion 140 performs signal processing according to the flowchart of FIG. 9. The example indicates a case in which: an upshift determination for shifting the automatic transmission 14 from the second speed "2nd" to the third speed "3rd" is made in response to, for example, an increase in the vehicle speed V due to the depression of the accelerator pedal (Power ON) (time t1); a 2nd-to-3rd upshift control (first shift control) that releases the first brake B1 and engages the third brake B3 is then executed; a downshift determination for shifting the automatic transmission 14 from the third speed "3rd" down to the second speed "2nd" is then made in response to, for example, the accelerator pedal 50 being further stepped down during the upshift operation from the second speed "2nd" to the third speed "3rd" (time t2); and a 3rd-to-2nd downshift control (second shift control) that engages the first brake B1 and releases the third brake B3 is then immediately performed in accordance with the downshift determination. In this case, the first brake B1 is the friction coupling element that is engaged in the second shift process (the friction coupling element to be engaged at the engagement side of the second shift process), and the third brake B3 is the friction coupling element that is released in the second shift process (the friction coupling element to be released at the release side of the second shift process). The hydraulic pressure command value 1 is associated with the first brake B1 and the hydraulic pressure command value 2 is associated with the third brake B3. Note that the hydraulic pressures of the first brake B1 and the third brake B3, that is, the actual engagement forces of the first brake B1 and the third brake B3, change with a delay in response to the automatic transmission of the hydraulic pressure command values 1, 2 and more smoothly than specified by the hydraulic pressure command values 1, 2.

Hereinafter, a detailed description will be made the "return multiple shift" for a 2nd-3rd-2nd shift, i.e., the control for shifting the automatic transmission 14 back to the second speed "2nd" during the shifting from the second speed "2nd" to the third speed "3rd" with reference to the flowchart of FIG. 9. In step 1, the multiple shift portion 140 determines whether a multiple shift determination has been made due to a shift determination for a second shift process being made during a first shift process. If so, the multiple shift portion 140 then executes step 2. In step 2, the multiple shift portion 140 determines whether the second shift process is the one for shifting the automatic transmission 14 back to the first speed "1st" that is the automatic transmission 14 was in before the first shift process was activated (return multiple shift). If so, the multiple shift portion 140 executes step 3. In step 3, the multiple shift portion 140 determines whether the turbine speed NT, which is the input shaft rotational speed, is in the vicinity of a synchronous rotational speed ntdoki2 for the second speed "2nd", which is the automatic transmission 14 is to be shifted in the second shift process, that is, whether the shift determination for the second shift process has been made before the beginning of the inertia phase of the first shift process in which the turbine speed NT changes. If the turbine speed NT is in the vicinity of the synchronous rotational speed ntdoki2, the multiple shift portion 140 then executes step 4. The synchronous rotational speed ntdoki2 is obtained by multiplying the speed ratio of the second speed "2nd", which is the speed to which the automatic transmission 14 is to be shifted in the second shift process, with the output shaft rotational speed NOUT. Whether the turbine speed NT is in the vicinity of the synchronous rotational speed ntdoki2 may be determined based on, for example, whether the turbine speed NT is within the range of $\pm\alpha$ from the synchronous rotational speed ntdoki2 (ntdoki2+$\alpha$) where $\pm\alpha$ represents the error of the turbine speed sensor 76.

In step 4, the multiple shift portion 140 determines, based on the hydraulic pressure command value 1 for the first brake B1, whether the engagement force of the first brake B1, which is the friction coupling element to be engaged at the engagement side of the second shift process, is equal to or greater than a predetermined value. Specifically, the predetermined value is a value at or above which the first brake B1 is considered to be still engaged with at least a certain amount of hydraulic fluid being left in the hydraulic cylinder of the first brake B1. In other words, the predetermined value is set to a value at or above which the first brake B1 may be engaged with at least a certain level of engagement force by the hydraulic pressure command value 1 for the first brake B1 being increased in the second shift control, despite the response delays of the actual hydraulic pressure PB1, even if the second shift control has been immediately activated in response to the second shift process determination at time t2. Note that, if the gradient of change in the hydraulic pressure command value 1 is different for the type of each shift operation, or the like, the predetermined value may be variably set according to each gradient of change, or the like. Alternatively, the predetermined value may be set differently depending upon the manner of shift control, such as whether the automatic transmission 14 is to be shifted up or down, whether the engine 10 is driving the vehicle (Power ON) or being driven (Power OFF), the shift operation type (from which speed to which speed), etc.

Referring again to FIG. 9, if "YES" is obtained in step 4, that is, if it is determined in step 4 that the first brake B1 is still engaged with at least a certain amount of hydraulic fluid being left in the hydraulic cylinder of the first brake B1, the multiple shift portion 140 switches the shift control from the first shift control to the second shift control in step 5, so that the second shift control immediately starts. In the second shift control, unlike in normal single shift controls, the hydraulic pressure command value 1 for the first brake B1 is increased at such a rate that the engagement force of the first brake B1 increases gradually, and the hydraulic pressure command value 2 for the third brake B3, which is the friction coupling element to be released at the release side of the second shift process, is reduced at such a rate that the engagement force of the third brake B3 decreases gradually, as indicated in FIG. 10. These change rates of the hydraulic pressure command values 1, 2 may be predetermined rates. In this example embodiment, however, they are set using, for example, a predetermined map that is defined by, as its parameters, the input torque of the automatic transmission 14, the engine torque, and/or the accelerator operation amount Acc indicating the torque required by the driver, such that the first brake B1 remains fully engaged and thus the turbine speed NT does not fall outside the vicinity of the synchronous rotational speed ntdoki2.

In step 6, the multiple shift portion 140 prohibits execution of a third shift control. Therefore, even if a shift determination for a third shift process is made during the second shift control, the shift control is not switched from the second shift control to the third shift control. Next, in step 7, the multiple shift portion 140 determines whether the second shift control has been completed. Here, if the turbine speed NT has been maintained in the vicinity of the synchronous rotational speed ntdoki2, which is the synchronous speed for the second speed "2nd", which is the automatic transmission 14 is to be shifted in the second shift process, for a reference time period hanteiT or longer, the multiple shift portion 140 determines that the engagement process of the first brake B1 has been completed (time t3). Then, based on that determination, the multiple shift portion 140 rapidly increases the hydraulic pressure command value 1 for the first brake B1 up to a MAX pressure (line pressure) and finishes the second shift control (time t4). After the second shift control is completed, "YES" (positive determination) is obtained in step 7, and then a next shift is allowed in step 8.

According to the shift control apparatus of this example embodiment, as described above, if the turbine speed NT is in the vicinity of the synchronous rotational speed ntdoki2, which is the synchronous rotational speed for the speed to which the automatic transmission 14 is to be shifted in the second shift process, when a multiple shift determination is made (time t2), in other words, if a shift determination for the second shift process, which shifts the automatic transmission 14 back to the speed that the automatic transmission 14 was in before the first shift control was activated (return multiple shift), has been made before the beginning of the inertia phase of the first shift process in which the turbine speed NT changes, the multiple shift portion 140 immediately switches the shift control from the first shift control to the second shift control in step 5, provided that the hydraulic pressure command value 1 associated with the engagement force of the first brake B1, which is the friction coupling element to be engaged at the engagement side of the second shift process, is equal to or larger than the predetermined value. Thus, according to the shift control apparatus of this example embodiment, the second shift control may be quickly activated while suppressing shift shocks and therefore the response to acceleration requests, etc. from the driver improves accordingly. Namely, when the engagement force of the first brake B1 is equal to or larger than the predetermined value, it indicates that the first shift process has not yet proceeded sufficiently and the first brake B1 is still engaged with at least a certain amount of hydraulic fluid being left in the hydraulic cylinder of the first brake B1. In this case, therefore, even if the shift control is immediately switched to the second shift control, the second shift control may be appropriately executed while suppressing shift shocks.

According to the example embodiment, in particular, the multiple shift portion 140 gradually increases the engagement force of the first brake B1 by increasing the hydraulic pressure command value 1 for the first brake B1, which is to be engaged in the second shift process, at a specific rate while gradually reducing the engagement force of the third brake B3, which is the friction coupling element to be released at the release side of the second shift process, by reducing the hydraulic pressure command value 2 for the third brake B3, which is released in the second shift process, at a specific rate. Thus, by appropriately setting these rates, it is possible to perform the second shift process such that the first brake B1 remains engaged and thus the turbine speed NT does not fall outside the vicinity of the synchronous rotational speed ntdoki2. Therefore, the second shift process may be quickly completed while suppressing shocks which may otherwise be caused by sharp and sudden changes in the turbine speed NT, and so on. Further, in the example embodiment, because the electronic control unit 90 sets the change rates of the hydraulic pressure command value 1 and the hydraulic pressure command value 2 using the input torque, the engine torque, and the accelerator operation amount Acc, which are all related to the engagement state of the first brake B1 as parameters, it is possible to keep the first brake B1 fully engaged.

Also, in the example embodiment, when a shift determination for the third shift process is made while the second shift control is ongoing in step 5, the multiple shift portion 140, in step 6, prohibits the shift control from switching to the third shift control, so that the second shift control continues until its completion. According to the example embodiment, therefore, the control does not become complicated and therefore shift shocks, which may otherwise be caused by complexities of the control, may be prevented. That is, because the multiple shift portion 140, unlike in normal single shift controls, immediately starts to increase the hydraulic pressure command value 1 for the first brake B1 at a specific rate and to reduce the hydraulic pressure command value 2 for the third brake B3 at a specific rate during the second shift control in step 5, if another shift is performed during such a special shift control, it makes the control difficult and thus increases the possibility of shift shocks.

In the meantime, in the example embodiment described above, the multiple shift portion 140 executes step 4 when the turbine speed NT, which is the rotational speed of the input shaft, is in the vicinity of the synchronous rotational speed ntdoki2 for the speed to which the automatic transmission 14 is to be shifted in the second shift process. Alternatively, the multiple shift portion 140 may be adapted to execute step 4 based on factors other than the turbine speed NT. For example, the multiple shift portion 140 may instead execute step 4 when the rotational speed of the input shaft is in the vicinity of the synchronous rotational speed ntdoki2 for the speed to which the automatic transmission 14 is to be shifted in the second shift process.

Further, in the example embodiment, descriptions have been made only of the case in which the multiple shift portion 140 determines that the engagement force of the first brake B1, which is the friction coupling element to be engaged at the engagement side of the second shift process, is equal to or larger than the predetermined value. Conversely, if the engagement force of the first brake B1 is smaller than the predetermined value, a "return multiple shift" that shifts the automatic transmission 14 back to the speed that the automatic transmission 14 was in before the first shift control process was activated may be performed in the second shift process.

Further, in the example embodiment, although only the case in which the engagement force of the first brake B1, which is the friction coupling element to be engaged at the engagement side of the second shift process, is determined as equal to or larger than the predetermined value has been described, if the engagement force of the first brake B1 is smaller than the predetermined value, the engagement force may be increased.

While the invention has been described with reference to the example embodiment thereof, it is to be understood that the invention is not limited to the described embodiment and construction. To the contrary, the invention is intended to cover various modifications and equivalent arrangements. In addition, while the various elements of the example embodiment are shown in various example combinations and configurations, other combinations and configurations, including more, less or only a single element, are also within the spirit and scope of the invention.

What is claimed is:

1. A shift control apparatus for an automatic transmission that shifts among a plurality of speed with different speed ratios by selectively engaging one or more of a plurality of friction coupling elements, comprising a multiple shift portion includes:

an engagement force determination portion that determines whether an engagement force of a friction coupling element to be engaged at an engagement side in a second shift process is equal to or larger than a predetermined value, when a multiple shift determination is made due to a determination for a second shift control for performing the second shift process being made during a first shift control for performing a first shift process, based on a command value associated with the engagement force of the friction coupling element to be engaged at the engagement side; and a shift switching portion that immediately switches a shift control of the automatic transmission from the first shift control to the second shift control if the engagement force determination portion determines that the engagement force of the friction coupling element to be engaged at the engagement side is equal to or larger than the predetermined value.

2. The shift control apparatus according to claim 1, wherein the engagement force determination portion determines whether the engagement force of the friction coupling element to be engaged at the engagement side is equal to or larger than the predetermined value when a rotational speed of an input shaft of the automatic transmission is in a vicinity of a synchronous rotational speed for a speed to which the automatic transmission is to be shifted in the second shift process.

3. The shift control apparatus according to claim 1, wherein if the engagement force determination portion determines that the engagement force of the friction coupling element to be engaged at the engagement side is smaller than the predetermined value, the multiple shift portion shifts, in the second shift process, the automatic transmission back to a speed that the automatic transmission was in before the first shift process was activated.

4. The shift control apparatus according to claim 1, wherein if the engagement force determination portion determines that the engagement force of the friction coupling element to be engaged at the engagement side is smaller than the predetermined value, the multiple shift portion increases the engagement force of the friction coupling element to be engaged at the engagement side.

5. The shift control apparatus according to claim 1, wherein when the shift switching portion has switched the shift control of the automatic transmission from the first shift control to the second shift control, the multiple shift portion executes the second shift control such that the engagement force of the friction coupling element to be engaged at the engagement side increases while the engagement force of a friction coupling element to be released at a release side in the second shift process decreases.

6. The shift control apparatus according to claim 1, wherein when the shift switching portion has switched the shift control of the automatic transmission from the first shift control to the second shift control, the multiple shift portion continues the second shift control until the second shift process is completed, even if a determination for a third shift process is made while the second shift control is being executed.

7. The shift control apparatus according to claim 6, wherein the multiple shift portion determines an end of an engagement process of the friction coupling element to be engaged at the engagement side, when the rotational speed of the input shaft of the automatic transmission has been in the vicinity of a synchronous rotational speed of the speed to which the automatic transmission is to be shifted in the second shift process, for a predetermined time period or longer, and the multiple shift portion completes the second shift control by increasing the engagement force of the friction coupling element to be engaged at the engagement side, based on the determination for the end of the engagement process of the friction coupling element to be engaged at the engagement side.

8. A shift control method for an automatic transmission that shifts among a plurality of speeds with different speed ratios by selectively engaging one or more of a plurality of friction coupling elements, comprising:

determining whether an engagement force of a friction coupling element to be engaged at an engagement side in a second shift process is equal to or larger than a predetermined value, when a multiple shift determination is made due to a determination for a second shift control for performing the second shift process being made during a first shift control for performing a first shift process, based on a command value associated with the engagement force of the friction coupling element to be engaged at the engagement side; and immediately switching a shift control of the automatic transmission from the first shift control to the second shift control, if it is determined that the engagement force of the friction coupling element to be engaged at the engagement side is equal to or larger than the predetermined value.

9. The shift control method according to claim 8, wherein the determination as to whether the engagement force of the friction coupling element to be engaged at the engagement side is equal to or larger than the predetermined value is made when a rotational speed of an input shaft of the automatic transmission is in a vicinity of a synchronous rotational speed for a speed to which the automatic transmission is to be shifted in the second shift process.

10. The shift control method according to claim 8, wherein if it is determined that the engagement force of the friction coupling element to be engaged at the engagement side is smaller than the predetermined value, the automatic transmission, in the second shift process, is shifted back to a speed that the automatic transmission was in before the first shift process was activated.

11. The shift control method according to claim 8, wherein if it is determined that the engagement force of the friction coupling element to be engaged at the engagement side is smaller than the predetermined value, the engagement force of the friction coupling element to be engaged at the engagement side is increased.

12. The shift control method according to claim 8, wherein when the shift control of the automatic transmission has been switched from the first shift control to the second shift control, the second shift control is executed such that the engagement force of the friction coupling element to be engaged at the engagement side increases while the engagement force of a friction coupling element to be released at a release side in the second shift process decreases.

13. The shift control method according to claim 8, wherein when the shift control of the automatic transmission has been switched from the first shift control to the second shift control, the second shift control continues until the second shift process is completed, even if a determination for a third shift process is made while the second shift control is being executed.

14. The shift control method according to claim 13, wherein
an end of an engagement process of the friction coupling element to be engaged at the engagement side is determined, when the rotational speed of the input shaft of the automatic transmission has been in the vicinity of a synchronous rotational speed of the speed to which the automatic transmission is to be shifted in the second shift process, for a predetermined time period or longer, and the second shift control is completed by increasing the engagement force of the friction coupling element to be engaged at the engagement side, based on the determination for the end of the engagement process of the friction coupling element to be engaged at the engagement side.

* * * * *